(12) United States Patent
Mölgaard et al.

(10) Patent No.: US 11,596,896 B2
(45) Date of Patent: Mar. 7, 2023

(54) EXHAUST GAS CLEANING SYSTEM AND METHOD FOR CLEANING EXHAUST GAS

(71) Applicant: ALFA LAVAL CORPORATE AB, Lund (SE)

(72) Inventors: Sören Mölgaard, Stoevring (DK); Casper Leemreize, Wijchen (NL)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/285,732

(22) PCT Filed: Oct. 1, 2019

(86) PCT No.: PCT/EP2019/076505
§ 371 (c)(1),
(2) Date: Apr. 15, 2021

(87) PCT Pub. No.: WO2020/078708
PCT Pub. Date: Apr. 23, 2020

(65) Prior Publication Data
US 2021/0308617 A1    Oct. 7, 2021

(30) Foreign Application Priority Data

Oct. 15, 2018 (EP) .................................... 18200320

(51) Int. Cl.
*B01D 53/14* (2006.01)
*B01D 21/26* (2006.01)
(Continued)

(52) U.S. Cl.
CPC ....... *B01D 53/1425* (2013.01); *B01D 21/262* (2013.01); *B01D 53/1412* (2013.01);
(Continued)

(58) Field of Classification Search
CPC ............. B01D 53/1425; B01D 21/262; B01D 53/1412; B01D 53/1493; B01D 2252/103;
(Continued)

(56) References Cited

U.S. PATENT DOCUMENTS 9,266,055 B2     2/2016  Konigsson et al.
2012/0067219 A1* 3/2012  Ogawa ................... B01D 53/30
                                                      95/178

(Continued)

FOREIGN PATENT DOCUMENTS

CN    104797790 A      7/2015
CN    108691608 B  *  10/2020
(Continued)

OTHER PUBLICATIONS

Bing search—ship scrubber centrifugal separator and membrane (Year: 2021).*

(Continued)

*Primary Examiner* — Christopher P Jones
*Assistant Examiner* — Phillip Y Shao
(74) *Attorney, Agent, or Firm* — Buchanan Ingersoll & Rooney PC

(57) ABSTRACT

An exhaust gas cleaning system comprises a first sub system including a scrubber unit comprising a scrubber arranged to wash the exhaust gas with a scrubber fluid, and a centrifugal separator arranged in communication with the scrubber unit for receiving the scrubber fluid after washing and separate it into a first and a second fraction, which second fraction is more polluted than the first fraction. The exhaust gas cleaning system further comprises a second sub system including a membrane filter arranged in communication with the centrifugal separator for receiving the first fraction output from the centrifugal separator and separating it into a third and a fourth fraction, which fourth fraction is more polluted (Continued)

than the third fraction. A method for cleaning exhaust gas onboard a ship involves cleaning an exhaust gas onboard a ship.

19 Claims, 2 Drawing Sheets

(51) Int. Cl.
*C02F 1/38* (2023.01)
*C02F 1/44* (2023.01)
*F01N 3/04* (2006.01)
*C02F 103/18* (2006.01)

(52) U.S. Cl.
CPC .......... *B01D 53/1493* (2013.01); *C02F 1/385* (2013.01); *C02F 1/44* (2013.01); *F01N 3/04* (2013.01); *B01D 2252/103* (2013.01); *C02F 2103/18* (2013.01)

(58) Field of Classification Search
CPC ........ C02F 1/385; C02F 1/44; C02F 2103/18; F01N 3/04
See application file for complete search history.

(56) References Cited

U.S. PATENT DOCUMENTS

| | | | |
|---|---|---|---|
| 2013/0233796 A1* | 9/2013 | Rao | C02F 1/008 210/639 |
| 2016/0016109 A1 | 1/2016 | Strandberg | |
| 2018/0243461 A1 | 8/2018 | Lee et al. | |

FOREIGN PATENT DOCUMENTS

| | | |
|---|---|---|
| DE | 27 1 5 082 A1 | 10/1978 |
| EP | 2 402 288 A1 | 1/2012 |
| EP | 2788104 B1 | 12/2017 |
| EP | 3 266 702 A1 | 1/2018 |
| JP | 2004081933 A | 3/2004 |
| JP | 2013-527788 A | 7/2013 |
| JP | 2014-511451 A | 5/2014 |
| KR | 10-1590551 B1 | 2/2016 |
| KR | 20170014287 A | 2/2017 |
| KR | 10-2017-0031559 A | 3/2017 |
| KR | 20170041039 A | 4/2017 |
| RU | 2015 136 259 A | 3/2017 |
| WO | 0002646 A1 | 1/2000 |
| WO | WO-0002646 A1 * | 1/2000 ............ B01D 53/60 |
| WO | 2010149173 A2 | 12/2010 |
| WO | 2011104302 A1 | 9/2011 |
| WO | 2012/113977 A1 | 8/2012 |
| WO | 2014/082823 A1 | 6/2014 |
| WO | 2014/128261 A1 | 8/2014 |
| WO | 2015079115 A1 | 6/2015 |
| WO | 2016012532 A1 | 1/2016 |
| WO | 2017/043722 A1 | 3/2017 |

OTHER PUBLICATIONS

CN-108691608-B english abstract (Year: 2022).*
Notice of Allowance (Grant of Patent) dated Jun. 9, 2021, by the Korean Intellectual Property Office in corresponding Korean Patent Application No. 10-2021-7014269 and an English Translation of the Notice of Allowance (4 pages).
International Preliminary Report on Patentability issued Oct. 8, 2020, by the European Patent Office as the International Searching Authority for International Application No. PCT/EP2019/076505.
International Search Report (PCT/ISA/210) and Written Opinion (PCT/ISA/237) dated Oct. 28, 2019, by the European Patent Office as the International Searching Authority for International Application No. PCT/EP2019/076505, 13 pages.
Third Party Observations filed on Dec. 23, 2020 in International Patent Application No. PCT/EP2019/076505, 9 pages.
Response to Third Party Observations filed on Apr. 9, 2021 in International Patent Application PCT/EP2019/076505, 4 pages.
Webpage, http://www.knm-group.com/knm_products-membrane-2.htm, KNM Group Berhad, exact date of publication unknown, but at least as early as Mar. 13, 2018, 1 page.
English Translation of the Office Action (Decision to Grant) dated Oct. 20, 2021, by the Federal Service for Intellectual Property (ROSPATENT) in corresponding Russian Patent Application No. 2021113695/12(028983). (7 pages).
English Translation of the First Office Action dated Jul. 14, 2021, by the National Intellectual Property Administration, P. R. China in corresponding Chinese Patent Application No. 201980067710.7. (4 pages).
English Translation of the Office Action (Notice of Reasons for Rejection) dated Oct. 4, 2021, by the Japanese Patent Office in corresponding Japanese Patent Application No. 2021-533416. (5 pages).
Opposition lodged against counterpart European patent EP 3 640 444 B1 entitled "Exhaust gas cleaning system and method for cleaning exhaust gas" or "Exhaust gas cleaning system and method for Exhaust gas purification". (Jan. 14, 2022). (27 pages).
Lecture: Engine and SOx Scrubber Technologies to meet IMO fuel quality requirements on sulfur and SOx, CIMAC Circle SMM 2008, (Sep. 25, 2008), (7 pages).
Statement of Opposition against E8 reference, EP 2 402 288 B1, (Aug. 14, 2017). (39 pages).
Grounds of the opposition division on the revocation of EP 2 921 214 B1 (same patent family as E2 (WO 2011/104302 A1), Application No. 15 166 210.3, (Sep. 30, 2021). (22 pages).

* cited by examiner

EXHAUST GAS CLEANING SYSTEM AND METHOD FOR CLEANING EXHAUST GAS

TECHNICAL FIELD

The invention relates to an exhaust gas cleaning system for cleaning exhaust gas onboard a ship, e.g. from a marine engine, burner or boiler. The invention also relates to a method for cleaning exhaust gas onboard a ship, e.g. from a marine engine, burner or boiler, by means of such an exhaust gas cleaning system.

BACKGROUND ART

Large ships are typically driven by engines operating on sulphur containing fuel. In the combustion of such fuel, exhaust gas containing sulphur oxides ($SO_X$) is formed. The exhaust gas typically also contains particulate matter, such as soot, oil and heavy metals, and nitrogen oxides ($NO_X$). In order to reduce the impact of the exhaust gas on the environment, the exhaust gas should be cleaned before it is released into the atmosphere. For example, the exhaust gas could be passed through a scrubber to be washed with a scrubber fluid whereby pollutants in the exhaust gas are caught in the scrubber fluid.

The scrubber could be a so-called open loop scrubber, which uses the natural alkalinity of seawater to wash out the sulphur oxides from the exhaust gas. Seawater is then fed from the sea through the scrubber for absorption of $SO_X$ and particulate matter from the exhaust gas before it is discharged directly back to the sea.

Alternatively, the scrubber could be a so-called closed loop scrubber which uses circulating freshwater or seawater in combination with an alkaline agent like sodium hydroxide (NaOH) or sodium carbonate ($Na_2CO_3$) to wash out sulphur oxides and particulate matter from the exhaust gas. In such a scrubber, the amounts of aqueous sulphite, sulphate salts and particulate matter in the circulating freshwater or seawater are gradually increasing. Thus, to control the quality of the circulating freshwater or seawater a small amount of it may occasionally or continuously be replaced by clean freshwater or seawater and either be stored on the ship or be discharged overboard after cleaning from particulate matter.

WO 2011/104302 describes an exhaust gas cleaning equipment comprising a closed loop scrubber and a centrifugal separator for separating polluted scrubber fluid into a pollutant phase, which contains most of the particulate matter, and cleaned scrubber fluid. Although this exhaust gas cleaning equipment functions well, it may not be capable of producing cleaned scrubber fluid sufficiently free from particulate matter to be discharged overboard, especially if the flow of scrubber fluid is high. If the cleaned scrubber fluid cannot be discharged overboard, it must be stored on board the ship for later discharge.

SUMMARY

An object of the present invention is to provide an exhaust gas cleaning system for cleaning exhaust gas onboard a ship and a method for cleaning exhaust gas by means of such a system that at least partly solve the above mentioned problem. The basic concept of the invention is to use a centrifugal separator for removing most of the particulate matter, herein also referred to as PM, from the scrubber fluid and then a membrane filter for removing residues of particulate matter from the scrubber fluid to make it clean enough to be discharged overboard. The exhaust gas system and the method according to the invention are defined in the appended claims and discussed below.

An exhaust gas cleaning system according to the present invention is arranged for cleaning exhaust gas onboard a ship. It comprises a first sub system which includes a scrubber unit and a centrifugal separator. The scrubber unit comprises a scrubber arranged to wash the exhaust gas with a scrubber fluid. The centrifugal separator is arranged in communication with the scrubber unit for receiving the scrubber fluid after washing and separate it into a first and a section fraction, which second fraction is more polluted, i.e. dirtier, than the first fraction. The scrubber comprises an exhaust gas inlet for receiving the exhaust gas and an exhaust gas outlet for outputting the washed exhaust gas. The exhaust gas cleaning system is characterized in that it further comprises a second sub system including a membrane filter. The membrane filter is arranged in communication with the centrifugal separator for receiving the first fraction output from the centrifugal separator and separating it into a third and a fourth fraction, which fourth fraction is more polluted, i.e. dirtier, than the third fraction.

The exhaust gas cleaning system could be arranged for cleaning exhaust gas from a marine engine onboard a ship, a marine burner onboard a ship or a marine boiler onboard s ship.

It should be stressed that "communicating" and "communication", throughout the text, means "communicating directly or indirectly" and "direct or indirect communication", respectively. Similarly, "receiving", "feeding", etc., throughout the text, means "receiving directly or indirectly" and "feeding directly or indirectly", respectively.

The centrifugal separator may receive all, nothing or some of the scrubber fluid from the scrubber unit, and this may vary over time.

The membrane filter may receive all, nothing or some of the first fraction of the scrubber fluid from the centrifugal separator, and this may vary over time.

The centrifugal separator may, for example, be a high speed separator, a decanter, or a combination thereof.

The membrane filter may, for example, be polymeric or ceramic, or a combination thereof. Further, the membrane filter may be of cross flow type.

In that the centrifugal separator may receive scrubber fluid from the scrubber unit, cleaning or the scrubber fluid from particulate matter absorbed from the exhaust gas may be enabled. Further, in that the membrane filter may receive the first fraction of the scrubber fluid, i.e. the cleaned scrubber fluid, from the centrifugal separator, further cleaning of the scrubber fluid from particulate matter absorbed from the exhaust gas may be enabled.

A scrubber fluid inlet of the scrubber may be arranged in communication with a scrubber fluid outlet of the scrubber. Thereby, recirculation of scrubber fluid, i.e. a closed loop scrubber, may be enabled.

The scrubber unit may further comprise a circulation tank, wherein the circulation tank is in communication with the scrubber, e.g. with the scrubber fluid outlet thereof, for receiving the scrubber fluid from the scrubber after washing, the circulation tank is in communication with the scrubber, e.g. with the scrubber fluid inlet thereof, for feeding the scrubber fluid to the scrubber, and the circulation tank is in communication with the centrifugal separator for feeding the scrubber fluid to the centrifugal separator.

The centrifugal separator may be in communication with the scrubber unit for feeding the first fraction of the scrubber fluid to the scrubber unit, e.g. the scrubber and/or the circulation tank, if such is present, thereof. Thereby, a return of cleaner scrubber fluid to the scrubber unit is rendered possible which may enable that a particulate matter level of the scrubber fluid in the scrubber unit is maintained sufficiently low.

The centrifugal separator may feed all, nothing or some of the first fraction of the scrubber fluid to the scrubber unit, and this may vary over time.

The first sub system may further comprise a switching module communicating with the centrifugal separator, the scrubber unit and the membrane filter. The switching module may be arranged to receive the first fraction of the scrubber fluid output from the centrifugal separator and feed the first fraction of the scrubber fluid to the membrane filter and/or the scrubber unit.

The switching module may receive all, nothing or some of the first fraction of the scrubber fluid from the centrifugal separator, and this may vary over time. Further, the switching module may feed all, nothing or some of the first fraction of the scrubber fluid to the membrane filter and/or the scrubber unit, and this may vary over time.

The membrane filter may be in communication with the scrubber unit for feeding the fourth fraction of the scrubber fluid to the scrubber unit, e.g. the scrubber and/or the circulation tank, if such is present, thereof.

The membrane filter may feed all, nothing or some of the fourth fraction of the scrubber fluid to the scrubber unit, and this may vary over time.

The second sub system may further comprise a water analysis unit arranged to determine a number ≥1 of parameter values of the third fraction of the scrubber fluid. The parameter values can be used to decide on further handling of the third fraction of the scrubber fluid.

The membrane filter may be in communication with the scrubber unit for feeding the third fraction of the scrubber fluid to the scrubber unit, i.e. the scrubber or the circulation tank, if such is present, thereof, if at least one of said parameter values exceeds or equals a respective limit value. Then, the third fraction of the scrubber fluid may be too dirty to be discharged from the exhaust gas system.

The exhaust gas cleaning system may be arranged to discharge the third fraction of the scrubber fluid from the exhaust gas cleaning system if each of said parameter values is below said respective limit value. For example, the third fraction of the scrubber fluid may be discharged overboard, or to a temporary storage tank for later discharge overboard.

The first sub system may further comprise a chemical dosing unit arranged to supply a chemical substance to the scrubber fluid. Thereby, the efficiency of the exhaust gas cleaning system may be optimized. For example, the chemical dosing unit may be arranged to supply the chemical substance to the scrubber fluid downstream the scrubber unit and upstream, i.e. before it is received by, the centrifugal separator. Further, the chemical substance may contain a flocculant and/or a coagulant. Thereby, the efficiency of the centrifugal separator may be optimized. Also, the chemical substance may contain an alkaline agent for adjusting the pH of the scrubber fluid.

Additionally, the first sub system may further comprise a flocculation unit downstream the chemical dosing unit and upstream the centrifugal separator arranged to hold the scrubber fluid before it is received by the centrifugal separator to allow sufficient time for flocculation. Thereby, the efficiency of the centrifugal separator may be further optimized.

A method according to the present invention is arranged for cleaning exhaust gas onboard a ship by means of an exhaust gas cleaning system. The method comprises washing the exhaust gas with a scrubber fluid in a scrubber comprised in a scrubber unit, and separating the scrubber fluid, after washing, in a centrifugal separator, into a first and a second fraction, which second fraction is more polluted than the first fraction. The scrubber unit and the centrifugal separator are comprised in a first sub system of the exhaust gas cleaning system. The method is characterized in further comprising passing the first fraction of the scrubber fluid through a membrane filter to separate it into a third and a fourth fraction, which fourth fraction is more polluted than the third fraction. The membrane filter is comprised in a second sub system of the exhaust gas cleaning system.

The method could be arranged for cleaning exhaust gas from a marine engine onboard a ship, a marine burner onboard a ship or a marine boiler onboard a ship.

The method may further comprise recirculating the scrubber fluid through the scrubber.

The method may further comprise feeding the first fraction of the scrubber fluid to the scrubber unit from the centrifugal separator.

The method may further comprise feeding the fourth fraction of the scrubber fluid to the scrubber unit.

The method may further comprise determining a number ≥1 of parameter values of the third fraction of the scrubber fluid.

The method may further comprise feeding the third fraction of the scrubber fluid to the scrubber unit if at least one of said parameter values exceeds or equals a respective limit value.

The method may further comprise discharging the third fraction of the scrubber fluid from the exhaust gas cleaning system if each of said parameter values is below said respective limit value.

The method may further comprise supplying a chemical substance, containing e.g. a flocculant and/or a coagulant and/or a pH adjusting alkaline agent, to the scrubber fluid in the first sub system, e.g. downstream the scrubber unit and upstream the centrifugal separator. Further, the method may comprise holding the scrubber fluid in a flocculation unit after supply of the chemical substance to it and before it is fed to the centrifugal separator to enable sufficient time for flocculation.

The above discussed advantages of the different embodiments of the exhaust gas cleaning system according to the invention are also present for the corresponding different embodiments of the method for cleaning exhaust gas according to the present invention.

Still other objectives, features, aspects and advantages of the invention will appear from the following detailed description as well as from the drawings.

BRIEF DESCRIPTION OF THE DRAWINGS

The invention will now be described in more detail with reference to the appended schematic drawings, in which.

DETAILED DESCRIPTION

Figure 1:
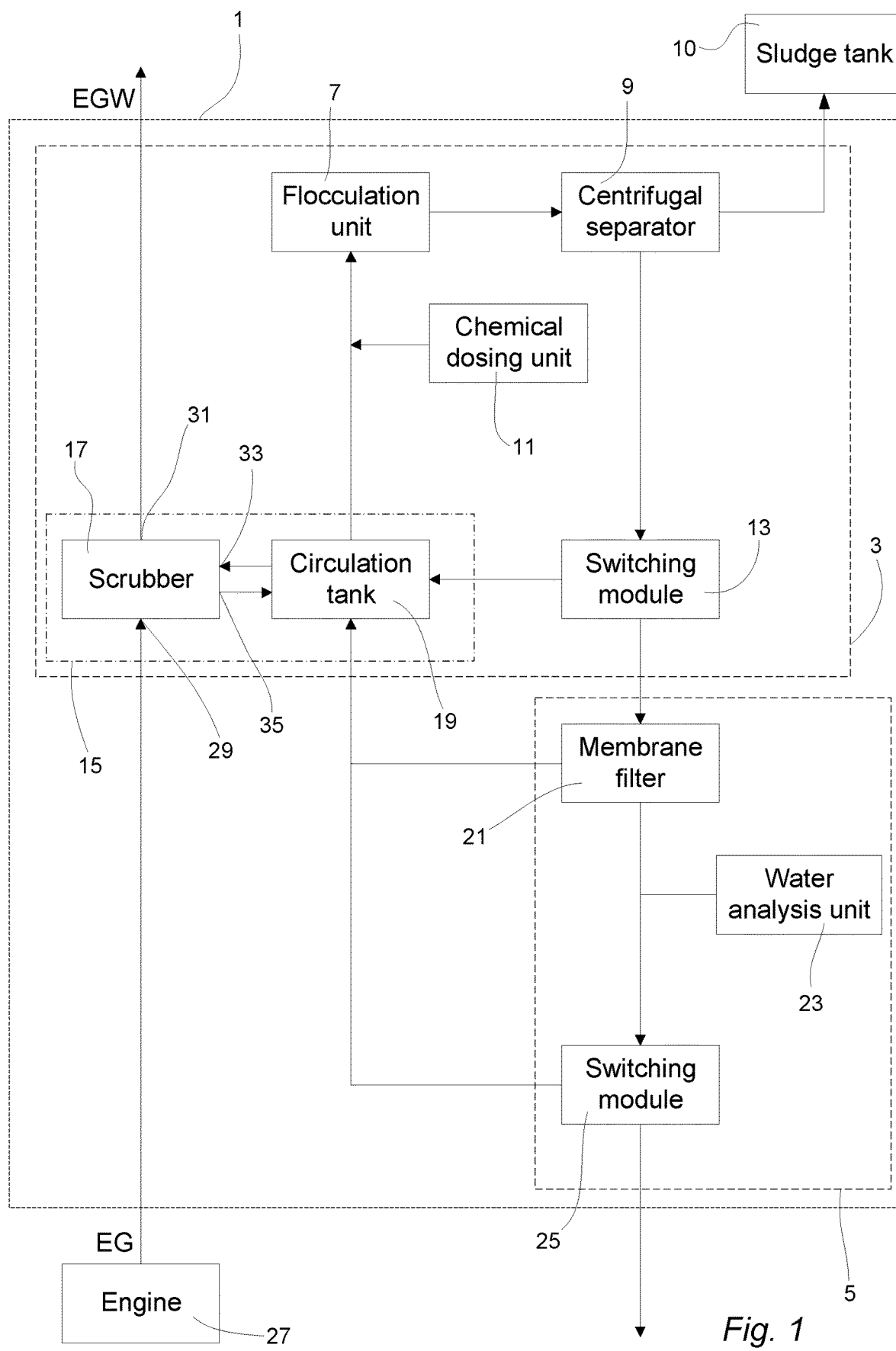
FIG. 1 is a block diagram schematically illustrating an exhaust gas cleaning system according to the invention.

FIG. 1 illustrates a exhaust gas cleaning system 1 comprising a first sub system 3 and a second sub system 5. In turn, the first sub system 3 comprises a flocculation unit 7, a centrifugal separator 9 in the form of a high speed separator, a sludge tank 10, a chemical dosing unit 11, a switching module 13 and a scrubber unit 15, which scrubber unit 15 contains a scrubber 17 and a circulation tank 19. The second sub system 5 comprises a membrane filter 21 of cross flow type with a pore size of 0.15 micro meter, a water analysis unit 23 and a switching module 25. The exhaust gas cleaning system is configured to clean exhaust gas EG from a marine diesel engine 27 on board a ship (not illustrated). Accordingly, the scrubber 17 comprises an exhaust gas inlet 29 for receiving the exhaust gas EG from the engine 27 and an exhaust gas outlet 31 for releasing washed exhaust gas EGW.

Figure 2:
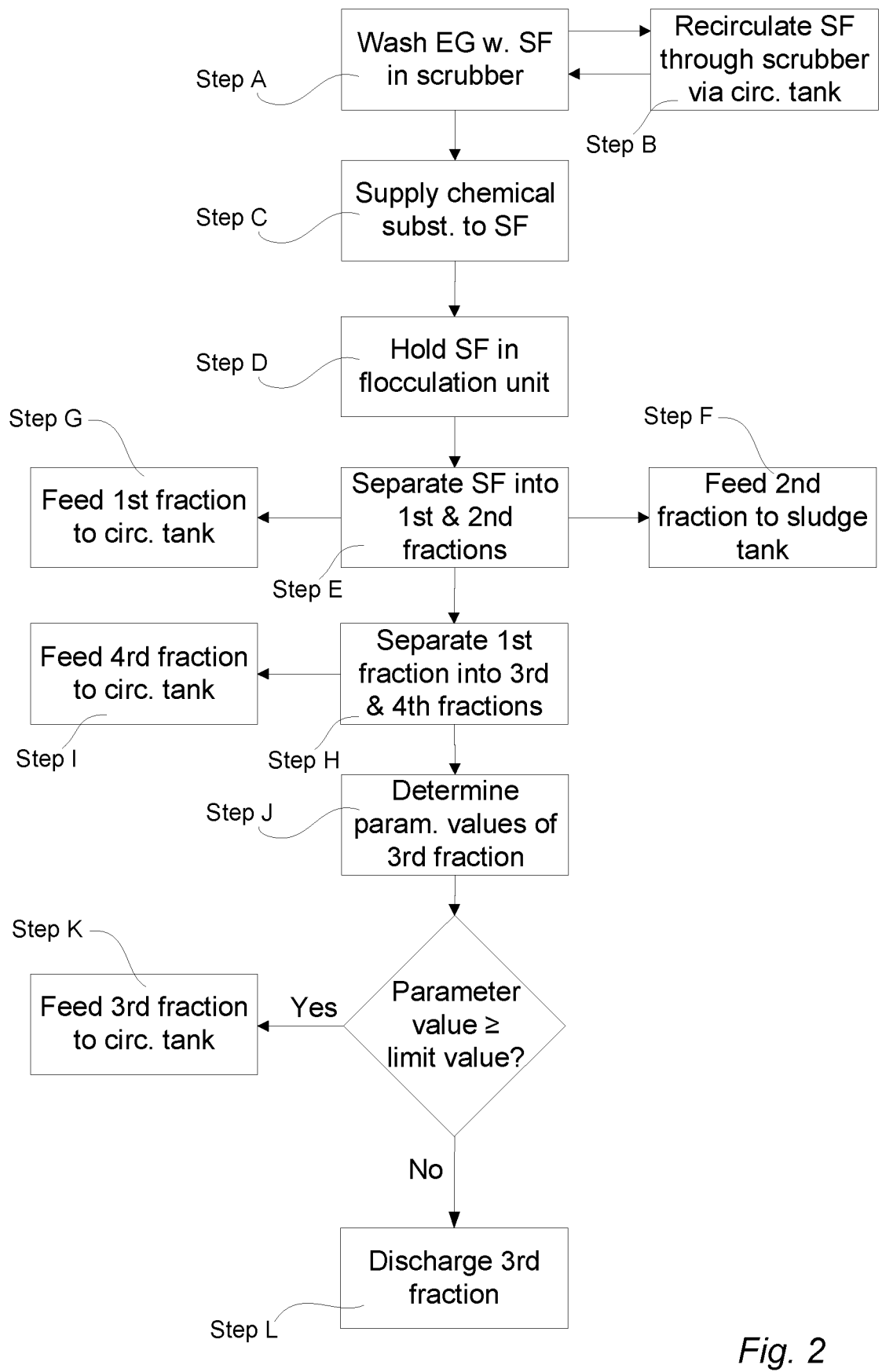
FIG. 2 is a flow chart illustrating the method for cleaning exhaust gas according to the invention.

FIG. 2 illustrates a method for cleaning the exhaust gas EG from the engine 27. Inside the scrubber 17, the exhaust gas is washed with a scrubber fluid SF (Step A) in the form of freshwater containing an alkaline agent like sodium hydroxide (NaOH). The scrubber works in a conventional way not further described herein. The scrubber fluid SF is fed from the circulation tank 19 to the scrubber 17 through a scrubber fluid inlet 33 thereof. Inside the scrubber 17 the scrubber fluid SF absorbs pollutants from the exhaust gas EG to clean it whereupon the scrubber fluid SF is fed through a scrubber fluid outlet 35 back to the circulation tank 19. Therefore, the scrubber fluid inlet 33 communicates indirectly, i.e. via the circulation tank 19, with the scrubber fluid outlet 35 whereby the scrubber fluid SF is recirculated through the scrubber 17 (Step B).

When the scrubber fluid SF is recirculated through the scrubber 17 it gets more and more polluted. To ensure an efficient operation of the scrubber 17, the scrubber fluid must not get too polluted. Accordingly, some of the scrubber fluid SF is continuously pumped from the circulation tank 19 to be cleaned. To ensure a sufficient amount of scrubber fluid in the circulation tank 19 it is replenished with scrubber fluid to make up for the pumped-off scrubber fluid. This replenishment could involve addition of clean freshwater and alkaline agent from outside the exhaust gas cleaning system 1. Further, "internal" replenishment of scrubber fluid may take place by return of scrubber fluid to the circulation tank 19 after cleaning, as will be further described below.

A chemical substance, containing a coagulant in the form of poly aluminum chloride and the alkaline agent for adjusting the scrubber fluid pH to 6.5, is supplied, by the chemical dosing unit 11, to the scrubber fluid SF pumped off from the circulation tank 19 (Step C) before it is received in a flocculation unit 7 communicating with the circulation tank 19. Inside the flocculation unit 7 the coagulant-containing scrubber fluid SF is held and mixed to enable proper flocculation (Step D) before it is received by the centrifugal separator 9 communicating with the flocculation unit 7, and thus (indirectly) with the circulation tank 9. The centrifugal separator 9 separates the flocks-containing scrubber fluid SF into first and second fractions (Step E). The second fraction, which is more polluted than the first fraction, is discharged to the sludge tank 10 (Step F). What happens to the cleaner first fraction depends on which mode the exhaust gas cleaning system 1 is in.

In a first mode, the switching module 13 is set such that 100% of the first fraction is fed back to the scrubber unit 15, more particularly the circulation tank 19 thereof (Step G), which is in communication with the centrifugal separator 9, whereby the circulation tank 19 is replenished with cleaned scrubber fluid. In a second mode, the switching module 13 is set such that x %, 0≤x<100, of the first fraction is fed back to the circulation tank 19 (Step G) to replenish the same (depending on the value of x), while (100−x) % of the first fraction is fed to the membrane filter 21, which is in communication with the centrifugal separator 9. x is adjustable and may be kept constant or varied during operation of the exhaust gas cleaning system 1. Whether the exhaust gas cleaning system 1 is in the first mode or the second mode depends, inter alia, on the amount of aqueous sulphite and sulphate salts in the scrubber fluid, and the amount of scrubber fluid in the first sub system 3.

The membrane filter 21 separates the first fraction into third and fourth fractions (Step H). The fourth fraction, which is more polluted than the third fraction, is fed back to the scrubber unit 15, more particularly the circulation tank 19 thereof (Step I), which is in communication with the membrane filter 21, whereby the circulation tank 19 is replenished with scrubber fluid. What happens to the cleaner third fraction depends on how polluted it is.

A turbidity value, a pH value and a PAH (Polycyclic Aromatic Hydrocarbons) value of the third fraction is determined by the water analysis unit 23 (Step J) and communicated to the switching module 25. The switching module 25 is set such that, if one or more of the turbidity value, the pH value and the PAH value exceeds or equals a respective limit value, here 25 NTU, 6.5 and 2250 ppb, respectively, the third fraction is fed back to the scrubber unit 15, more particularly the circulation tank 19 thereof (Step K), which is in communication with the membrane filter 21, whereby the circulation tank 19 is replenished with cleaned scrubber fluid. Further, if the turbidity value, the pH value and the PAH value all are lower than the respective limit values, the third fraction is discharged from the exhaust gas cleaning system 1 (Step L), overboard or to a temporary holding tank (not illustrated) for later discharge, for example if the ship is in an area where discharge overboard is prohibited.

Thus, the scrubber fluid pumped off from the circulation tank 19 is cleaned first by means of the centrifugal separator 9. The centrifugal separator 9 efficiently removes most of the particulate matter and is capable of handling very high levels of PM without getting blocked. Thus, the centrifugal separator 9 is capable and suitable for keeping the scrubber fluid circulating in the first sub system 3 of the exhaust gas cleaning system 1 sufficiently free from PM. However, if the flow of scrubber fluid in the first sub system 3 is high, the centrifugal separator 9 may be uncapable of removing enough particulate matter to make the scrubber fluid clean enough to be discharged overboard. The cleaned, here first, fraction of the scrubber fluid is then cleaned further by means of the membrane filter 21. The membrane filter 21 efficiently removes nearly all of the remaining particulate matter. Since the scrubber fluid fed through the membrane filter 21 has been pre-cleaned by the centrifugal separator 9, the level of PM in the scrubber fluid is low enough not to clog the membrane filter 21. Thereby, a significantly higher flow through the membrane filter than normal is enabled.

The components of the above described exhaust gas cleaning system are connected by suitable piping to allow them to communicate in the above specified way. Further, the exhaust gas system described above may comprise additional components to make it work properly, such as pumps, valves, sensors, further water analysis units, control units etc. As an example, the exhaust gas system may comprise a pH meter or sensor between the scrubber and the circulation tank for measuring the pH of the scrubber fluid. This pH meter may communicate with the chemical dosing unit 11.

It should be stressed that the steps of the method according to the invention have been named Step A, Step B, etc. just for identification purposes. Thus, the steps need not be performed in the specific order Step A, Step B, etc. Furthermore, one or more steps may be left out in alternative embodiments.

The above described embodiment of the present invention should only be seen as an example. A person skilled in the art realizes that the embodiment discussed can be varied in a number of ways without deviating from the inventive conception.

As an example, the exhaust gas cleaning system could be operated with other coagulants than the above specified, with a flocculant, for example a polymer, instead of a coagulant, or with a mixture of coagulant and flocculant.

The membrane filter may have another pore size than the above given, both larger and smaller.

In the above described embodiment, the water analysis unit 23 is arranged to determine a turbidity value, a pH value and a PAH value of the third fraction of the scrubber fluid and the handling of the third fraction is dependent on these values. In alternative embodiments, the water analysis unit may be arranged to determine only one or two of these parameters, additional parameters and/or other parameters.

The exhaust gas cleaning system need not comprise a circulation tank. Thus, in an alternative embodiment the centrifugal separator 9 could be arranged to feed the first fraction to the scrubber 17 instead of to a circulation tank. In another alternative embodiment, the exhaust gas cleaning system could be of open loop type so as to not include recirculation or return of the scrubber fluid.

The scrubber fluid need not comprise freshwater and an alkaline agent but could instead comprise seawater and an alkaline agent or a combination thereof.

It should be stressed that the attributes first, second, third, etc. is used herein just for distinguishing purposes and not to express any kind of specific order.

It should be stressed that a description of details not relevant to the present invention has been omitted and that the figures are just schematic and not drawn according to scale.

The invention claimed is:

1. Exhaust gas cleaning system for cleaning exhaust gas onboard a ship, which exhaust gas cleaning system comprises a first sub system including
a scrubber unit comprising a scrubber arranged to wash the exhaust gas onboard the ship with a scrubber fluid that washes pollutants in the exhaust gas to clean the exhaust gas, the pollutants including sulphur oxides and particulate matter,
a centrifugal separator arranged in communication with the scrubber unit for receiving the scrubber fluid after the washing and for separating the scrubber fluid into a first and a second fraction, which second fraction is more polluted with the particulate matter than the first fraction,
wherein the scrubber comprises an exhaust gas inlet for receiving the exhaust gas and an exhaust gas outlet for outputting the washed exhaust gas,
the exhaust gas cleaning system further comprising a second sub system including a membrane filter arranged in communication with the centrifugal separator for receiving the first fraction output from the centrifugal separator and separating it into a third and a fourth fraction, which fourth fraction is more polluted than the third fraction,
wherein the first sub system further comprises a switching module that receives at least some of the first fraction output from the centrifugal separator and that is configured to operate between two modes, the two modes being: i) a first mode in which 100% of the first fraction received by the switching module is fed back into the scrubber unit; and ii) a second mode in which x % of the first fraction received by the switching module is fed back into the scrubber unit while (100−x) % of the first fraction received by the switching module is fed to the membrane filter; wherein 0≤x<100, and
the centrifugal separator being in communication with the scrubber unit for feeding the first fraction of the scrubber fluid to the scrubber unit.

2. Exhaust gas cleaning system according to claim 1, wherein a scrubber fluid inlet of the scrubber is arranged in communication with a scrubber fluid outlet of the scrubber.

3. Exhaust gas cleaning system according to claim 2, wherein the scrubber unit further comprises a circulation tank, wherein the circulation tank is in communication with the scrubber for receiving the scrubber fluid from the scrubber after washing, the circulation tank is in communication with the scrubber for feeding the scrubber fluid to the scrubber, and the circulation tank is in communication with the centrifugal separator for feeding the scrubber fluid to the centrifugal separator.

4. Exhaust gas cleaning system according to claim 1, wherein the membrane filter is in communication with the scrubber unit for feeding the fourth fraction of the scrubber fluid to the scrubber unit.

5. Exhaust gas cleaning system according to claim 1, wherein the second sub system further comprises a water analysis unit arranged to determine a number ≥1 of parameter values of the third fraction of the scrubber fluid.

6. Exhaust gas cleaning system according to claim 5, wherein the membrane filter is in communication with the scrubber unit for feeding the third fraction of the scrubber fluid to the scrubber unit if at least one of said parameter values exceeds or equals a respective limit value.

7. Exhaust gas cleaning system according to claim 6, arranged to discharge the third fraction of the scrubber fluid from the exhaust gas cleaning system if each of said parameter values is below said respective limit value.

8. Method for cleaning exhaust gas onboard a ship by means of an exhaust gas cleaning system, the method comprising
washing the exhaust gas onboard the ship with a scrubber fluid that washes pollutants in the exhaust gas to clean the exhaust gas, the pollutants washed by the scrubber fluid including sulphur oxides and particulate matter, the washing of the exhaust gas occurring in a scrubber comprised in a scrubber unit,
separating the scrubber fluid, after the washing, in a centrifugal separator, into a first and a second fraction, which second fraction is more polluted with the particulate matter than the first fraction;
wherein the scrubber unit and the centrifugal separator are comprised in a first sub system of the exhaust gas cleaning system,
the method further comprising
passing the first fraction of the scrubber fluid through a membrane filter to separate it into a third and a fourth fraction, which fourth fraction is more polluted than the third fraction, wherein the membrane filter is comprised in a second sub system of the exhaust gas cleaning system, and
feeding the first fraction of the scrubber fluid to the scrubber unit from the centrifugal separator.

9. Method according to claim 8, further comprising recirculating the scrubber fluid through the scrubber.

10. Method according to claim 8, further comprising feeding the fourth fraction of the scrubber fluid to the scrubber unit.

11. Method according to claim 8, further comprising determining a number ≥1 of parameter values of the third fraction of the scrubber fluid.

12. Method according to claim 11, further comprising feeding the third fraction of the scrubber fluid to the scrubber unit if at least one of said parameter values exceeds or equals a respective limit value.

13. Method according to claim 12, further comprising discharging the third fraction of the scrubber fluid from the exhaust gas cleaning system if each of said parameter values is below said respective limit value.

14. Exhaust gas cleaning system according to claim 1, wherein the switching module operates between the first mode and the second mode depending upon: i) an amount of aqueous sulphite and/or sulphate salts in the scrubber fluid; and/or ii) an amount of scrubber fluid in the first sub system.

15. Exhaust gas cleaning system according to claim 1, further comprising:
a flocculation unit having an outlet and an inlet;
a chemical dosing unit, the chemical dosing unit being configured to supply a chemical substance that includes a flocculant and/or a coagulant to the scrubber fluid between the scrubber unit and the inlet of the flocculation unit; and
the outlet of the flocculation unit being connected to the centrifugal separator.

16. Method according to claim 8, wherein the exhaust gas cleaning system is in the first mode or the second mode depending upon an amount of aqueous sulphite and sulphate salts in the scrubber fluid, and an amount of the scrubber fluid in the first sub system.

17. Method according to claim 8, further comprising:
operating the exhaust gas cleaning system in a first mode and in a second mode, at different times;
feeding, when the exhaust gas cleaning system is in the first mode, 100% of the first fraction back into the scrubber unit; and
feeding, when the exhaust gas cleaning system is in the second mode, x % of the first fraction back into the scrubber unit, and feeding (100−x) % of the first fraction to the membrane filter, and wherein 0≤x<100.

18. Exhaust gas cleaning system for cleaning exhaust gas onboard a ship, which exhaust gas cleaning system comprises a first sub system including:
a scrubber unit comprising a scrubber arranged to wash the exhaust gas with a scrubber fluid;
a centrifugal separator arranged in communication with the scrubber unit for receiving the scrubber fluid after washing and separating it into a first and a second fraction, which second fraction is more polluted than the first fraction;
the scrubber comprising an exhaust gas inlet for receiving the exhaust gas and an exhaust gas outlet for outputting the washed exhaust gas;
the exhaust gas cleaning system further comprising a second sub system including a membrane filter arranged in communication with the centrifugal separator for receiving the first fraction output from the centrifugal separator and separating the first fraction into a third and a fourth fraction, which fourth fraction is more polluted than the third fraction;
the centrifugal separator being in communication with the scrubber unit for feeding the first fraction of the scrubber fluid to the scrubber unit;
the exhaust gas cleaning system further comprising
a flocculation unit having an outlet and an inlet; and
a chemical dosing unit, the chemical dosing unit being configured to supply a chemical substance that includes a flocculant and/or a coagulant to the scrubber fluid between the scrubber unit and the inlet of the flocculation unit; and
the outlet of the flocculation unit being connected to the centrifugal separator.

19. Method for cleaning exhaust gas onboard a ship by means of an exhaust gas cleaning system, the method comprising
washing the exhaust gas onboard the ship with a scrubber fluid in a scrubber comprised in a scrubber unit,
conveying the scrubber fluid, after the washing, from the scrubber unit to an inlet of a flocculation unit and supplying a chemical substance that includes a flocculant and/or a coagulant to the scrubber fluid between the scrubber unit and the inlet of the flocculation unit;
conveying the scrubber fluid from an outlet of the flocculation unit to a centrifugal separator;
separating the scrubber fluid in the centrifugal separator into a first and a second fraction, which second fraction is more polluted than the first fraction, the scrubber unit and the centrifugal separator being comprised in a first sub system of the exhaust gas cleaning system;
passing the first fraction of the scrubber fluid through a membrane filter to separate it into a third and a fourth fraction, which fourth fraction is more polluted than the third fraction, the membrane filter being comprised in a second sub system of the exhaust gas cleaning system; and
feeding the first fraction of the scrubber fluid to the scrubber unit from the centrifugal separator.

* * * * *